United States Patent [19]

Kurpershoek

[11] 4,441,344
[45] Apr. 10, 1984

[54] ATTACHMENT MEANS PROVIDED WITH A LOCK

[75] Inventor: Cornelis Kurpershoek, Bussum, Netherlands

[73] Assignee: Industri AB Thule, Hillerstorp, Sweden

[21] Appl. No.: 533,041

[22] Filed: Sep. 16, 1983

Related U.S. Application Data

[63] Continuation of Ser. No. 213,195, Dec. 4, 1980, abandoned.

[30] Foreign Application Priority Data

May 12, 1979 [NL] Netherlands ............... 7908770

[51] Int. Cl.³ .................................. F16B 41/00
[52] U.S. Cl. .................................. 70/231; 70/221; 70/258
[58] Field of Search ............. 70/19, 165, 185–186, 70/188, 218–219, 221, 229, 231–232, 258–260, DIG. 70; 224/42.25, 315; 74/548

[56] References Cited

U.S. PATENT DOCUMENTS

| 125,734 | 4/1872 | Hegner | 70/221 |
|---|---|---|---|
| 441,357 | 11/1890 | Crowell | 70/221 |
| 1,021,672 | 3/1912 | Hart | 70/219 |
| 1,150,999 | 8/1915 | Corley | 70/DIG. 70 |
| 1,261,151 | 4/1918 | Mueller | 70/221 |
| 1,375,044 | 4/1921 | Follick | 70/DIG. 70 |
| 1,381,206 | 6/1921 | Lonney | 70/219 |
| 1,444,214 | 2/1923 | Shultz | 224/42.25 |
| 1,516,418 | 11/1924 | Woodward | 70/DIG. 70 |
| 1,516,453 | 11/1924 | Nichols | 70/DIG. 70 |
| 1,592,630 | 7/1926 | Ganz | 70/221 |
| 1,613,794 | 1/1927 | Hanson | 70/165 |
| 1,629,015 | 5/1927 | Axelson | 70/231 |
| 1,640,763 | 8/1927 | Geyer | 70/221 |
| 1,678,174 | 7/1928 | White | 70/231 |
| 1,843,072 | 1/1932 | Stone | 70/231 |
| 2,076,246 | 4/1937 | Nelson | 74/548 |
| 2,098,730 | 11/1937 | Parker | 74/548 |
| 3,060,786 | 10/1962 | Flower | 70/232 |
| 4,096,715 | 6/1978 | Lipschultz | 70/19 |

FOREIGN PATENT DOCUMENTS

| 655094 | 12/1928 | France | 70/231 |
|---|---|---|---|
| 755302 | 9/1933 | France | 70/221 |
| 776659 | 11/1934 | France | 70/165 |
| 1201714 | 7/1959 | France | 70/221 |
| 288323 | 10/1928 | United Kingdom | 70/231 |

Primary Examiner—Robert L. Wolfe
Attorney, Agent, or Firm—Holman & Stern

[57] ABSTRACT

Apparatus for locking elements together is disclosed which comprises socket means defining a first axis, knob means, and fastener means for attaching the knob means to the socket means. The fastener means has first and second ends and a middle portion, the first end including means for affixing said fastener means coaxially with, and in, the socket means; the second end including a smooth bearing portion; and the middle portion including a head portion, having faces, positioned beneath the bearing portion. The knob means houses lock means therein and is rotatable on the fastener bearing portion. The lock means includes bolt means having a first portion pivotable about a second axis parallel to the first axis and between a first position wherein the knob means is free to rotate on the fastener bearing portion, and a second position wherein a second portion of the bolt means is engagable with one of the faces whereby rotation of the knob means about the fastener means is prevented, so that the fastener means is removable from the socket means.

8 Claims, 3 Drawing Figures

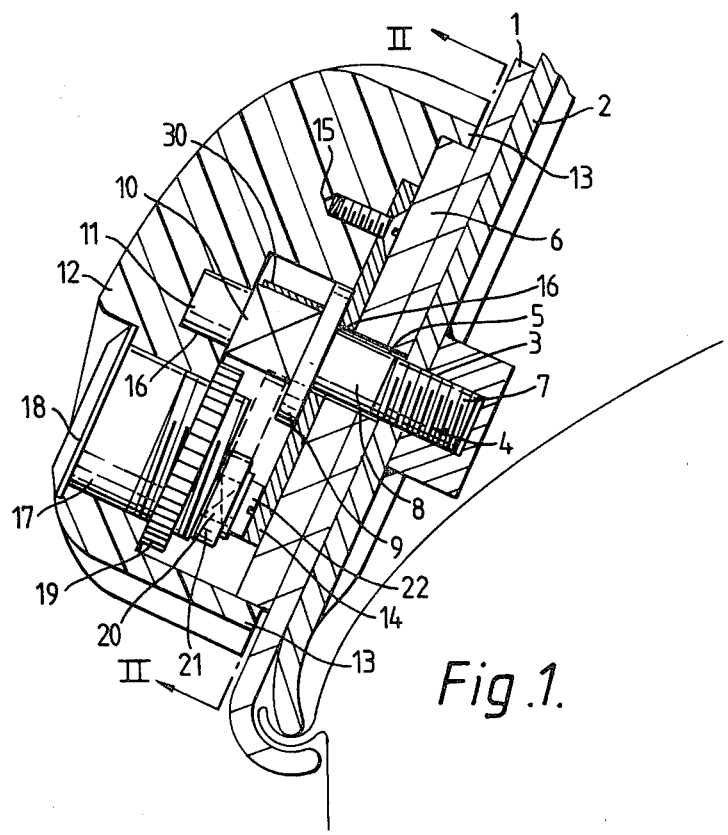
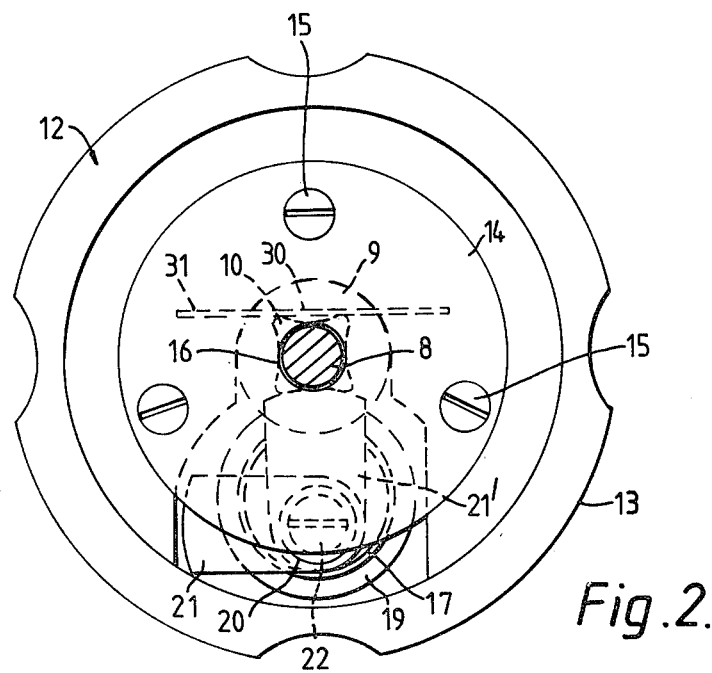

ATTACHMENT MEANS PROVIDED WITH A LOCK

This is a continuation of application Ser. No. 213,195, filed Dec. 4, 1980 and now abandoned.

BACKGROUND OF THE INVENTION

The invention relates to an attachment means which has to execute a rotary movement for attaching and releasing purposes. Such an attachment means is e.g. a threaded bolt, a nut or a part of a bayonet fixing. In particular, the underlying idea is e.g. the attachment of a rack on the roof of a car, which rack is often attached with bolts.

For the required protection against theft, there is increasingly used a lock construction for attaching products to be conveyed on a rack, such as a surfing board, skis or other components of high value. In practice, however, it appears simple to release the rack itself together with the load attached thereon through locks.

It is the object of the invention to provide a simple, inexpensive and effective attachment means which is provided with a lock and which practically excludes theft.

To this effect according to the invention, it is proposed to incorporate the attachment member performing the rotary movement, with at least one end axially locked up, in a knob, while attaching a lock eccentrically relative to the attachment member in the knob, said lock in a first locked position releasing the attachment member so that it is adapted for free rotation relative to the knob and whereby in a second position of the lock, the knob is locked relative to the attachment member. Preferably, use is made therefore of a locking means carried in the knob, said locking means coacting with a correspondingly formed face on the attachment member. Preferably the knob is recessed at the back side, so that the knob shuts off the access to the attachment member itself.

One embodiment and a variant thereof will now be described, by way of example, with reference to the accompanying drawing, while also further features of the invention will be elucidated.

BRIEF DESCRIPTION OF THE DRAWINGS

FIG. 1 is a perspective and diagrammic view of a partial cross section of the attachment means according to the invention.

FIG. 2 is a view, partly in cross section, on the lines II—II in FIG. 1;

DETAILED DESCRIPTION OF THE INVENTION

Figure 3:
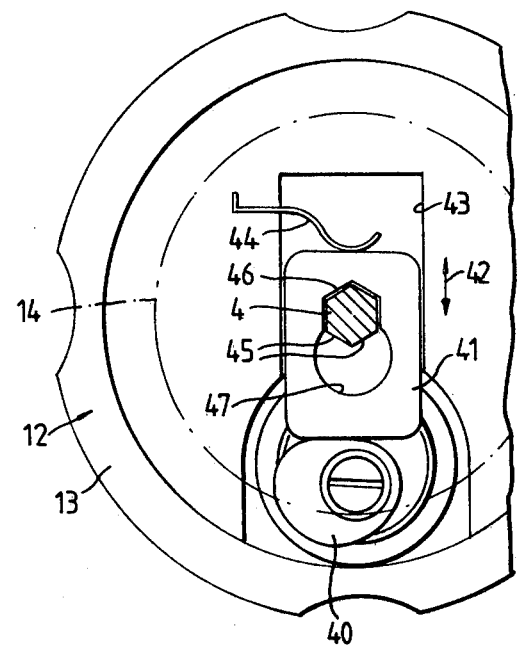
FIG. 3 is a view according to FIG. 2 of a variant embodiment.

In FIG. 1 are shown two retainer parts 1, and 2, which are to be attached to each other in such a way that these can be secured by a lock. In this example retainer part 2 is fitted with a blind hole 3 provided with a screw thread wherein can be screwed a threaded element 4, e.g. a threaded fastener or attachment member. By means of such attachment portion 4, the other portion 1 can be fixedly attached on retainer part 2. To this effect, part 1 is provided with a continuous bore 5 through which the element 4 can freely move. The part 1 is fitted with a raised boss 6. Element 4, above the threaded end portion 7, has a smooth neck portion 8 which extends from an annular shoulder 9. Above said shoulder there is disposed a substantially square head portion 10, whose faces are concave and serve as locking faces. The element 4 is disposed with one end in a knob generally indicated by 12. Said knob is provided with a projecting edge 13 within which the raised boss 6 is situated. The element 4 is maintained in position through a retainer plate 14, which, by means of three bolts 15, only one of which being indicated, is attached in the knob 12. The retainer plate 14 is fitted with a central bore 16 whereby it abuts against the shoulder 9 and thus functions as a guide for the smooth neck portion 8 of element 4. The circular cylindrical bearing portion 11 of fastener 4 is slidingly received in a bore 16 in the knob 12. In the position shown, see also FIG. 2, the knob 12 can freely rotate relative to element 4.

The knob and the fastener head, are axially locked relative to each other by the retainer plate 14.

Eccentrically in the knob 12 there is provided a cylindrical lock 17, which lock is provided with an outer cylinder having a support rim 18 and secured at the inside by means of a threaded ring 19. On the end 20 of the usual key-rotatable plug, there is present a head portion whereon is secured a locking arm 21 through a bolt 22. Preferably, the lock is so designed that in two positions, differing e.g. 90° or 180° from each other, the key can be removed from the lock. At any rate the key should be removable when the locking arm 21 is in the position shown in full lines in FIG. 2.

In the position 21' of the locking arm shown in broken lines in FIG. 2, the end of the locking arm rests against one of the faces of the head portion 10.

In order to easily effect the locking, there is disposed opposite the plug, hence at the other side of the head portion, a leaf spring 30, which is secured in a slot 31 in the knob 12. As a result, it can be easily felt when the knob is in such a position relative to the element 4 that the lock plug can be rotated.

When the lock is in the position shown in FIG. 1 and FIG. 2, the element 4 is freely rotatable relative to the knob. The knob may then freely rotate and unauthorized release of the threaded connection is not possible in a simple manner. Since the threaded pin is disposed in a blind hole, said pin cannot be approached from the other side either. Because of the raised boss portion 6, which is contained within the projecting edge 13 of the knob 12, destruction of the threaded pin, e.g. by sawing through same, cannot be attained without completely destroying the knob. Depending on the contemplated application and the required strength, the knob can be made of plastics, reinforced plastics, (injection-moulded) aluminium, bronze, steel or other suitable material. Naturally, the knob 12 need not be of circular cross, section but may also be rectangular, straight-shaped or designed as a handle, provided only the lock can be eccentrically mounted and the access to the threaded pin in mounted condition is screened.

FIG. 3 shows a variant of a locking device, wherein the key-actuated locking member is operational in the same manner as arm 21 of the first embodiment and comprises a disc cam 40. Said disc cam is acting on a rectangular locking plate 41, which is locked right-angled to the plane of drawing, in a manner not shown, e.g. by means of a retainer plate 14 as shown in FIG. 1. Said locking plate 41 moves in the direction of the arrow 42 within a groove 43. Opposite the disc sam 40 there is provided a spring 44, which urges the locking plate 41 in the plane of drawing of FIG. 3 downwardly.

The head of threaded element 4 in this example has a hexagonal head cross-section, so that a plurality of locking faces 45 is formed. Said locking faces coact with a correspondingly formed aperture portion 46 in the locking plate 41, so that in the illustrated position there is effected a fixed connection between element 4 and the knob 12, not shown. When the lock is rotated through 180°, also the disc cam 40 rotates through 180°. During the rotation of the lock, the locking plate 41 is urged upwardly, so that the curcular portion 47 of the aperture becomes coaxial with element 4 and the locking faces 45. Said aperture portion 47 is so large that in this coaxial position the knob can freely rotate relative to the hexagon faces 45 on element 4. In said position therefore the connection between knob and element 4 is broken as far as the rotation is concerned.

It is observed that the locking device fitted with a lock according to the invention is not only suitable for application in a threaded pin, but that it is likewise possible to apply within the knob a nut which normally is enclosed in the knob, but a rotary motion of which is possible relative to the knob, whereby also in such case, by means of a lock, clutching can be effected between knob and nut. In particular the variant shown in FIG. 3 is naturally suitable for ensuring an effective locking when the nut has a hexagonal design at the exterior. The construction is also suitable for any other connection, whereby a rotational motion has to be effected and locked, e.g. in a bayonet fixing.

I claim:

1. An attachment device including a lock and a rotatable member for attaching and releasing purposes, comprising:
   a knob having outer and inner faces,
   an attachment member having an end portion rotatably mounted in the inner face of said knob,
   retaining means to retain said end portion in said knob,
   a locking head on said end portion having a plurality of discrete locking faces,
   a lock mounted in said knob accessible from the outer face thereof and eccentrically with respect to the axis of relative rotation of said attachment member and knob,
   a locking member operated by said lock for movement relative to said locking head between locking and unlocking positions,
   a locking face engaging part on said locking member engageable with and having a configuration substantially conforming with said locking face so that when said lock is in the unlocked position, said locking face engaging part coacts with at least one of said locking faces to positively prevent relative rotation between said knob and attachment member, and in the locked position said locking face engaging part is out of engagement with said locking faces to allow rotation of said knob relative to said attachment member, and
   a leaf spring mounted in said knob to resiliently urge said head locking member into a position where said discrete locking faces releasably retain said knob from relative rotation with respect to said locking head.

2. An attachment device including a lock and a rotatable member for attaching and releasing purposes, comprising:
   a knob having outer and inner faces,
   an attachment member having an end portion rotatably mounted in the inner face of said knob,
   retaining means to retain said end portion in said knob,
   a locking head on said end portion having a plurality of discrete locking faces,
   a lock mounted in said knob accessible from the outer face thereof and eccentrically with respect to the axis of relative rotation of said attachment member and knob,
   a locking member operated by said lock for movement relative to said locking head between locking and unlocking positions,
   a locking face engaging part on said locking member engageable with and having a configuration substantially conforming with said locking face so that when said lock is in the unlocked position, said locking face engaging part coacts with at least one of said locking faces to positively prevent relative rotation between said knob and attachment member, and in the locked position said locking face engaging part is out of engagement with said locking faces to allow rotation of said knob relative to said attachment member, and
   a leaf spring mounted in said knob and operably engaging said locking head to resiliently urge said knob rotatably with respect to said head into a position where said spring engages at least part of one of said discrete locking faces to releasably retain said knob from further relative rotation with respect to said locking head and position said lock for engagement of said locking member with a locking face.

3. An attachment devices as claimed in claim 2 wherein,
   a cylindrical recess is provided in said inner face of the knob,
   said retaining means comprises a circular retainer flange on said attachment member in said recess, a retainer plate attached to the inner face of said knob, and a bore hole through said retainer plate for relatively receiving said attachment member and having a diameter smaller than said flange,
   a lock bore extends from said outer face of said knob to said recess eccentrically with respect to said axis of relative rotation between said knob and attachment,
   said lock is mounted in said lock bore and has a rotatable lockable cylinder having its axis of rotation substantially parallel to the axis of rotation of said knob, and
   said locking member comprises a locking arm in said recess attached at one end to said lock cylinder to be rotated thereby and said locking face engaging part at the other end.

4. An attachment device as claimed in claim 3 wherein,
   said attachment member comprises a cylindrical bolt type member having said locking head on the inner end thereof within said recess, and
   said plurality of locking faces comprises four equal size locking faces each having a concavely curved configuration.

5. The attachment device of claim 1 wherein
   said locking member comprises a plate member having one region thereof slidable into engagement with a plurality of said locking faces for locking said knob against rotation relative to said attachment member.

6. The attachment device of claim 5 wherein said plate member has another region contiguous with said one region for releasing said plate member from locking engagement with said faces.

7. The attachment member of claim 6 wherein said one region is complementarily configured with said locking head of the attachment member, and said leaf spring resiliently urges said one region into locking engagement with said locking head.

8. The attachment device of claim 7 wherein said lock further comprises a locking arm pivotably mounted on said lock for operation thereby between locking and unlocking positions, and cam means, on said arm, for camming said plate means one region out of engagement with the locking head of said attachment member when said locking arm is moved to the locking position so that said knob rotates with respect to said attachment member.

* * * * *